(12) United States Patent
Maeda

(10) Patent No.: US 10,541,757 B2
(45) Date of Patent: Jan. 21, 2020

(54) RECEIVING APPARATUS AND SETTING METHOD

(71) Applicant: FUJITSU LIMITED, Kawasaki-shi, Kanagawa (JP)

(72) Inventor: Taizo Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/598,704

(22) Filed: May 18, 2017

(65) Prior Publication Data

US 2017/0366274 A1    Dec. 21, 2017

(30) Foreign Application Priority Data

Jun. 16, 2016   (JP) .................................. 2016-119790

(51) Int. Cl.
 *H04B 10/60* (2013.01)
 *H04B 10/61* (2013.01)
 (Continued)

(52) U.S. Cl.
 CPC ... *H04B 10/6162* (2013.01); *H04B 10/07951* (2013.01); *H04B 10/07953* (2013.01);
 (Continued)

(58) Field of Classification Search
 CPC .......... H04B 10/6162; H04B 10/07951; H04B 10/07953; H04B 10/07957;
 (Continued)

(56) References Cited

U.S. PATENT DOCUMENTS 7,496,298 B2 * 2/2009 Chen .................. H04B 10/2513
  398/149
8,078,065 B2 * 12/2011 Koc .................... H04B 10/6971
  398/152
(Continued)

FOREIGN PATENT DOCUMENTS

EP    2 639 976 A1    9/2013
EP    3 001 583 A1    3/2016
(Continued)

OTHER PUBLICATIONS

Hoshida et al., "Digital nonlinear compensation techniques for high-speed Dwdm transmission systems", Next-Generation Optical Communication: Components, Sub-Systems, and Systems, Proc. of SPIE, vol. 8284, 2012**.

(Continued)

*Primary Examiner* — Dibson J Sanchez
(74) *Attorney, Agent, or Firm* — Staas & Halsey LLP

(57) ABSTRACT

A receiving apparatus includes a first processor configured to compensate, in a perturbation back-propagation (PBP) scheme, waveform degradation of an optical signal by traveling an optical transmission line due to a nonlinear optical effect; a memory; and a second processor coupled to the memory and the second processor configured to change a gamma coefficient to be used in the PBP scheme, measure reception quality of the optical signal for each of gamma coefficients obtained by the changing, specify a gamma coefficient in accordance with the reception quality from among the gamma coefficients obtained by the changing, and set the specified gamma coefficient as a parameter of the PBP scheme.

6 Claims, 12 Drawing Sheets

(51) Int. Cl.
*H04B 10/079* (2013.01)
*H04B 10/2557* (2013.01)
*H04B 10/2507* (2013.01)

(52) U.S. Cl.
CPC ... *H04B 10/07957* (2013.01); *H04B 10/2557* (2013.01); *H04B 10/2572* (2013.01); *H04B 10/6161* (2013.01); *H04B 10/60* (2013.01)

(58) Field of Classification Search
CPC ............ H04B 10/2557; H04B 10/2572; H04B 10/6161; H04B 10/60
USPC .................................................. 398/202–214
See application file for complete search history.

(56) References Cited

U.S. PATENT DOCUMENTS

| | | | |
|---|---|---|---|
| 8,145,071 B2* | 3/2012 | Tanaka | H04B 10/6971 398/209 |
| 8,385,747 B2* | 2/2013 | Roberts | H04B 10/677 398/150 |
| 8,744,278 B2* | 6/2014 | Oda | H04B 10/6971 398/147 |
| 8,750,725 B2* | 6/2014 | Kropp | H04B 10/077 398/208 |
| 8,942,569 B2* | 1/2015 | Tanimura | H04B 10/5055 398/152 |
| 9,020,024 B1* | 4/2015 | Chaahoub | H04L 25/03885 375/229 |
| 9,385,766 B2* | 7/2016 | Abe | H04B 1/123 |
| 9,467,314 B1* | 10/2016 | Wei | H04L 7/0058 |
| 9,654,211 B2* | 5/2017 | Zhao | H04B 10/0795 |
| 9,673,911 B2 | 6/2017 | Awadalla | |
| 9,853,765 B2* | 12/2017 | Yasuda | H04B 10/6161 |
| 9,906,308 B1 | 2/2018 | Pajovic et al. | |
| 9,906,309 B2* | 2/2018 | Mertz | H04B 10/6163 |
| 9,923,641 B2* | 3/2018 | Yasuda | H04B 10/6161 |
| 10,396,851 B2* | 8/2019 | Abe | H04B 1/0475 |
| 2002/0123851 A1* | 9/2002 | Kurooka | H04B 10/2513 702/69 |
| 2003/0043440 A1* | 3/2003 | Suzaki | H04B 10/695 398/202 |
| 2003/0115006 A1* | 6/2003 | Schyndel | H04B 10/2513 702/85 |
| 2005/0019042 A1* | 1/2005 | Kaneda | H04B 10/695 398/208 |
| 2008/0019435 A1* | 1/2008 | Chou | H04L 1/20 375/232 |
| 2008/0031633 A1* | 2/2008 | Hoshida | H04B 10/677 398/149 |
| 2009/0116844 A1* | 5/2009 | Tanaka | H04B 10/677 398/115 |
| 2009/0214201 A1* | 8/2009 | Oda | H04B 10/0795 398/25 |
| 2009/0226165 A1* | 9/2009 | Tanaka | H04B 10/6971 398/25 |
| 2009/0245809 A1* | 10/2009 | Nakamoto | H04B 10/2507 398/159 |
| 2009/0245816 A1* | 10/2009 | Liu | H04B 10/60 398/208 |
| 2010/0014873 A1* | 1/2010 | Bulow | H04B 10/6161 398/159 |
| 2010/0046961 A1* | 2/2010 | Tanimura | H03F 3/08 398/159 |
| 2010/0092168 A1 | 4/2010 | Li et al. | |
| 2010/0196017 A1* | 8/2010 | Tanimura | H04B 10/6971 398/159 |
| 2010/0278528 A1* | 11/2010 | Isomura | H04B 10/61 398/25 |
| 2010/0329677 A1 | 12/2010 | Kaneda | |
| 2011/0142455 A1 | 6/2011 | Liu et al. | |
| 2011/0255879 A1* | 10/2011 | Xie | H04B 10/2513 398/208 |
| 2012/0026860 A1 | 2/2012 | Yan | |
| 2012/0027418 A1* | 2/2012 | Secondini | H04B 10/6971 398/158 |
| 2012/0045208 A1* | 2/2012 | Yasuda | H04B 10/60 398/65 |
| 2012/0051742 A1* | 3/2012 | Li | H04B 10/0795 398/38 |
| 2012/0076235 A1* | 3/2012 | Dou | H04B 10/2543 375/296 |
| 2012/0076491 A1 | 3/2012 | Yan et al. | |
| 2012/0082459 A1* | 4/2012 | Wu | H04B 10/616 398/79 |
| 2012/0148265 A1* | 6/2012 | Chang | H04B 10/6161 398/208 |
| 2012/0263464 A1 | 10/2012 | Koike-Akino et al. | |
| 2012/0275797 A1 | 11/2012 | Li et al. | |
| 2012/0290244 A1 | 11/2012 | Yan et al. | |
| 2013/0188948 A1* | 7/2013 | Dou | H04B 10/2543 398/28 |
| 2013/0209089 A1 | 8/2013 | Harley et al. | |
| 2013/0230313 A1 | 9/2013 | Yan et al. | |
| 2013/0243433 A1* | 9/2013 | Yan | H04B 10/2507 398/65 |
| 2013/0272719 A1* | 10/2013 | Yan | H04B 10/2507 398/159 |
| 2013/0287390 A1* | 10/2013 | Abe | H04B 3/142 398/26 |
| 2013/0302031 A1 | 11/2013 | Tanimura et al. | |
| 2014/0079407 A1* | 3/2014 | Dou | H04B 10/616 398/149 |
| 2014/0099128 A1* | 4/2014 | Mateo | H04B 10/6163 398/158 |
| 2014/0286642 A1* | 9/2014 | Lowery | H04B 10/697 398/115 |
| 2015/0010300 A1* | 1/2015 | Fan | H04B 10/0731 398/29 |
| 2015/0244456 A1 | 8/2015 | Layec | |
| 2015/0288458 A1* | 10/2015 | Honda | H04J 14/02 398/81 |
| 2015/0295643 A1* | 10/2015 | Zhao | H04B 10/0795 398/29 |
| 2015/0372765 A1* | 12/2015 | Yasuda | H04B 10/613 398/29 |
| 2016/0036528 A1* | 2/2016 | Zhao | H04B 10/58 398/141 |
| 2016/0050025 A1* | 2/2016 | Yasuda | H04B 10/6161 398/65 |
| 2016/0127047 A1* | 5/2016 | Napoli | H04B 10/2543 398/192 |
| 2016/0294480 A1* | 10/2016 | Mertz | H04B 10/6163 |
| 2018/0034552 A1 | 2/2018 | Oyama | |
| 2018/0123701 A1 | 5/2018 | Sato et al. | |

FOREIGN PATENT DOCUMENTS

| | | |
|---|---|---|
| JP | 2012-90262 | 5/2012 |
| JP | 2012-186806 | 9/2012 |
| JP | 2012-186807 | 9/2012 |
| JP | 2013-509747 | 3/2013 |

OTHER PUBLICATIONS

Ip, "Complexity Reduction Algorithms for Nonlinear Compensation using Digital Backpropagation", IEEE, 2012, pp. 388-389**.

Yan et al., "Low Complexity Digital Perturbation Backpropagation", ECOC Technical Digest, Optical Society of America, 2011**.

Partial European Search Report dated Nov. 17, 2017, in corresponding European Patent Application No. 17172715.9.

Non-Final Office Action dated Jun. 11, 2018 in child U.S. Appl. No. 15/935,588 (29 pages).

"*Nonlinear Polarization Crosstalk Canceller for Dual-Polarization Digital Coherent Receivers*"; Lei Li et al.; OSA/OFC/NFOEC, Mar. 2010; Fujitsu R&D Center, Chaoyang, Beijing, China; Fujitsu Laboratories Ltd., Kawasaki, Japan; Fujitsu Limited, Kawasaki, Japan (3 pages).

(56) References Cited

OTHER PUBLICATIONS

Extended European Search Report dated Mar. 16, 2018 in related European Patent Application No. 17172715.9 (14 pages).
Final Office Action dated Jan. 9, 2019 in corresponding U.S. Appl. No. 15/935,588 (20 pages).
Non-Final Office Action dated Apr. 26, 2019 in corresponding U.S. Appl. No. 15/935,588 (17 pages).
U.S. Appl. No. 15/935,588, filed Mar. 26, 2018, Maeda, Fujitsu Limited, Kawasaki-shi, JP.

* cited by examiner

| TRANSMISSION LINE DISPERSION VALUE (ps/nm) | | NUMBER OF FILTER TAPS |
|---|---|---|
| Min | Max | |
| 0 | 20000 | 41 |
| 20000 | 30000 | 81 |
| 30000 | 40000 | 121 |
| 40000 | 50000 | 161 |
| 50000 | 60000 | 201 |
| ... | ... | ... |

RECEIVING APPARATUS AND SETTING METHOD

CROSS-REFERENCE TO RELATED APPLICATION

This application is based upon and claims the benefit of priority of the prior Japanese Patent Application No. 2016-119790, filed on Jun. 16, 2016, the entire contents of which are incorporated herein by reference.

FIELD

The embodiments discussed herein are related to a receiving apparatus and a setting method.

BACKGROUND

In recent years, large-capacity and long-distance transmission has become desirable in optical transmission systems. Therefore, it is desirable to employ a method for compensating waveform degradation due to nonlinear optical effects such as self-phase modulation (SPM) and cross-phase modulation (XPM).

For example, SPM includes, in a broad sense, intra-channel cross-phase modulation (IXPM) caused by a nonlinear optical effect in a channel. As a method for compensating waveform degradation due to IXPM, for example, a nonlinear compensation method that uses perturbation back-propagation (PBP) is provided. In the PBP scheme, a perturbation analysis is performed on the Manakov equation to calculate a nonlinear distortion, and the calculated nonlinear distortion is reduced. In this manner, the waveform degradation due to SPM such as IXPM may be compensated at a receiving terminal.

As a factor contributing to the waveform degradation due to XPM, for example, inter-polarization crosstalk caused by a nonlinear optical effect between channels is conceivable. As a method for compensating the waveform degradation due to XPM, a nonlinear polarization crosstalk canceller (NPCC) scheme is provided. In the NPCC scheme, an inter-polarization crosstalk coefficient is calculated based on a first polarization signal and a second polarization signal that are received at a receiving terminal. The second polarization signal is a polarization signal orthogonal to the first polarization signal. In the NPCC scheme, the waveform degradation due to, for example, inter-polarization crosstalk caused by XPM may be compensated at the receiving terminal based on the calculated inter-polarization crosstalk coefficient.

Japanese Laid-open Patent Publication No. 2012-186806, Japanese Laid-open Patent Publication No. 2012-186807, Japanese National Publication of International Patent Application No. 2013-509747, and Japanese Laid-open Patent Publication No. 2012-090262 are examples of the related art.

When the compensation method that uses, for example, the PBP scheme or the NPCC scheme is employed, however, operation parameters are used and the maximum compensation effect is not attainable unless optimum values are set for the operation parameters. For example, in the PBP scheme, it is desirable that the number of filter taps, a gamma coefficient, and the like of the parameters to be used in the PBP scheme be set to optimum values. In the NPCC scheme, it is desirable that an averaging length of the parameters to be used in the NPCC be set to an optimum value. Regarding the averaging length, inputs of a set averaging length (averaging length of N (integer) corresponds to N samples) are averaged and output as processing of a digital filter.

When the PBP scheme or the NPCC scheme is employed, it is desirable to provide a receiving apparatus capable of setting optimum operation parameters in a short period of time while reducing the circuit scale.

SUMMARY

According to an aspect of the invention, a receiving apparatus includes a first processor configured to compensate, in a perturbation back-propagation (PBP) scheme, waveform degradation of an optical signal by traveling an optical transmission line due to a nonlinear optical effect; a memory; and a second processor coupled to the memory and the second processor configured to change a gamma coefficient to be used in the PBP scheme, measure reception quality of the optical signal for each of gamma coefficients obtained by the changing, specify a gamma coefficient in accordance with the reception quality from among the gamma coefficients obtained by the changing, and set the specified gamma coefficient as a parameter of the PBP scheme.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A receiving apparatus and a setting method according to embodiments disclosed herein are described below in detail with reference to the drawings. Note that the disclosed technologies are not limited to the embodiments. The embodiments described below may be combined with each other as appropriate.

Embodiments

Figure 1:
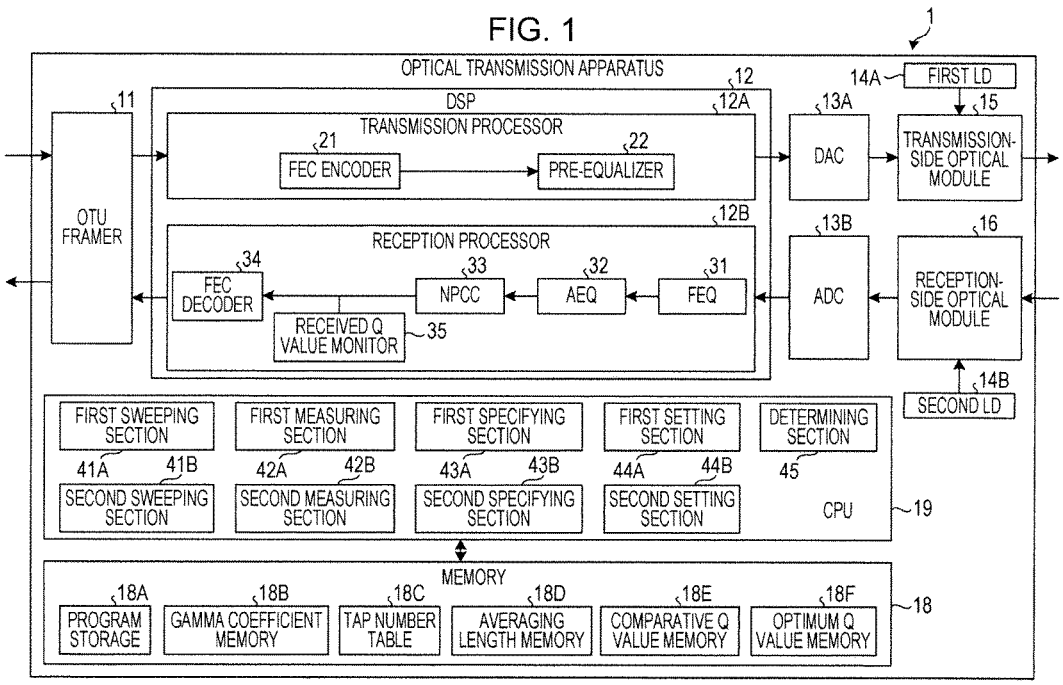
FIG. 1 is an explanatory diagram illustrating an example of the inside of an optical transmission apparatus of this embodiment.

FIG. 1 is an explanatory diagram illustrating an example of the inside of an optical transmission apparatus 1 of a first embodiment. The optical transmission apparatus 1 includes an optical-channel transport unit (OTU) framer 11, a digital signal processor (DSP) 12, a digital-to-analog converter (DAC) 13A, a first laser diode (LD) 14A, and a transmission-side optical module 15. The DSP 12 may be constituted by a plurality of DSPs. The DSP 12 includes a programmable logic device such as a field-programmable gate array (FPGA). Further, the optical transmission apparatus 1 includes a reception-side optical module 16, a second LD 14B, an analog-to-digital converter (ADC) 13B, a memory 18, and a CPU 19.

The OTU framer 11 is, for example, a frame processor configured to convert a client signal to an OTU frame and extract the client signal from the OTU frame. The DSP 12 includes a transmission processor 12A and a reception processor 12B. The transmission processor 12A is a digital processor configured to electrically execute various kinds of processing on a transmission side. The reception processor 12B is a digital processor configured to electrically execute various kinds of processing on a reception side. The transmission processor 12A includes an FEC encoder 21 and a pre-equalizer 22. The FEC encoder 21 is a processor configured to encode the OTU frame from the OTU framer 11. The pre-equalizer 22 is a processor configured to execute various kinds of signal processing such as chromatic dispersion compensation, frequency offset compensation, and compensation of input and output characteristics of the optical module. The DAC 13A is a processor configured to perform analog conversion on the OTU frame. The transmission-side optical module 15 is a processor configured to perform optical transmission of the OTU frame subjected to the analog conversion by using an optical signal from the first LD 14A.

The reception-side optical module 16 is a processor configured to receive the OTU frame by using an optical signal from the second LD 14B. The ADC 13B is a processor configured to perform digital conversion on the OTU frame. The reception processor 12B includes a fixed equalizer (FEQ) 31, an active equalizer (AEQ) 32, an NPCC 33, an FEC decoder 34, and a received Q value monitor 35. The FEQ 31 is a nonlinear compensator configured to compensate waveform degradation due to, for example, SPM and constituted by chromatic dispersion compensation (CDC) sections 50, PBP sections 60, and the like described later in a plurality of stages N. The AEQ 32 is a processor configured to execute various kinds of processing such as frequency offset compensation, polarization mode dispersion compensation, and carrier phase recovery. The NPCC 33 is a nonlinear compensator configured to compensate waveform degradation due to, for example, XPM. The FEC decoder 34 is a processor configured to decode the encoded data and execute error correction by using a parity check matrix or the like. The received Q value monitor 35 is a measuring section configured to monitor reception quality such as a received Q value of the received signal to be input to the FEC decoder 34.

The memory 18 is a storage area for various kinds of information on the optical transmission apparatus 1. The CPU 19 controls the overall optical transmission apparatus 1. The memory 18 includes a program storage 18A, a gamma coefficient memory 18B, a tap number table 18C, an averaging length memory 18D, a comparative Q value memory 18E, and an optimum Q value memory 18F. The program storage 18A stores various programs for executing processes in the CPU 19 as functional components.

The gamma coefficient memory 18B is a storage area for a gamma coefficient that is an operation parameter to be used in the PBP section 60. The tap number table 18C is a storage area for the number of filter taps that is an operation parameter to be used in the PBP section 60 and corresponds to a transmission line dispersion value of an optical transmission line to which the optical transmission apparatus 1 is connected. The averaging length memory 18D is a storage area for an averaging length that is an operation parameter to be used in the NPCC 33. The comparative Q value memory 18E is a storage area for a comparative Q value to be used for operation processing described later. The comparative Q value is a threshold for determining whether or not the received Q value has decreased during operation. The optimum Q value memory 18F is a storage area for an optimum Q value to be used for PBP optimization processing or NPCC optimization processing described later. The optimum Q value is a Q value to be used for specifying an optimum gamma coefficient in the PBP optimization processing or an optimum averaging length in the NPCC optimization processing.

The CPU 19 includes a first sweeping section 41A, a first measuring section 42A, a first specifying section 43A, a first setting section 44A, and a determining section 45 as functional components. Further, the CPU 19 includes a second sweeping section 41B, a second measuring section 42B, a second specifying section 43B, and a second setting section 44B as functional components. The first sweeping section 41A is a changing section configured to change, for example, sweep the gamma coefficient of the PBP section 60. The first sweeping section 41A sweeps the gamma coefficient in a predetermined unit within a sweeping range from an initial value to a maximum value. That is, the first sweeping section 41A sequentially sets the swept gamma coefficients in the PBP section 60. Then, the first measuring section 42A measures a received Q value for each gamma coefficient through the received Q value monitor 35 in response to the start of sweeping of the gamma coefficient. Further, the first specifying section 43A specifies a gamma coefficient at which the received Q value measured in response to the start of sweeping of the gamma coefficient is larger than the optimum Q value, and updates the specified gamma coefficient in the gamma coefficient memory 18B. When the first specifying section 43A has specified the gamma coefficient at which the received Q value is larger than the optimum Q value, the first setting section 44A sets the gamma coefficient in the PBP section 60 as an optimum gamma coefficient. In addition, the first setting section 44A specifies the number of filter taps corresponding to the transmission line dispersion value of the optical transmission line from the tap number table 18C, and sets the specified number of filter taps in the PBP section 60. The first sweeping section 41A, the first measuring section 42A, the first specifying section 43A, and the first setting section 44A execute the PBP optimization processing. The PBP optimization processing is processing of setting an optimum gamma coefficient and an optimum number of filter taps to be used in the PBP section 60.

When a current received Q value is acquired, the determining section 45 determines whether or not a differential Q value that is a difference between the current received Q value and the comparative Q value exceeds an allowable value such as 1 dB. When the differential Q value exceeds the allowable value, the determining section 45 resumes the PBP optimization processing.

The second sweeping section 41B is a changing section configured to change, for example, sweep the averaging length of the NPCC 33. The second sweeping section 41B sweeps the averaging length in a predetermined unit within a sweeping range from an initial value to a maximum value. That is, the second sweeping section 41B sequentially sets the swept averaging lengths in the NPCC 33. Then, the second measuring section 42B measures a received Q value for each averaging length through the received Q value monitor 35 in response to the start of sweeping of the averaging length. Further, the second specifying section 43B specifies an averaging length at which the received Q value measured in response to the start of sweeping of the averaging length is larger than the optimum Q value, and updates the specified averaging length in the averaging length memory 18D. When the second specifying section 43B has specified the averaging length at which the received Q value is larger than the optimum Q value, the second setting section 44B sets the averaging length in the NPCC 33 as an optimum averaging length. The second sweeping section 41B, the second measuring section 42B, the second specifying section 436, and the second setting section 44B execute the NPCC optimization processing. The NPCC optimization processing is processing of setting an optimum averaging length to be used in the NPCC 33.

Figure 2:
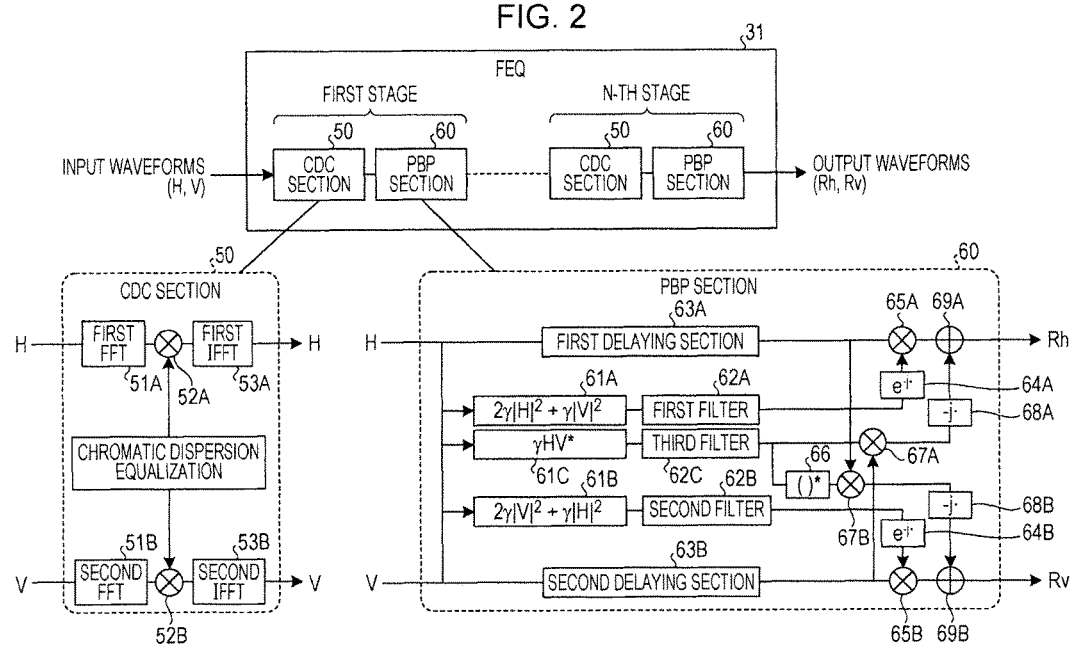
FIG. 2 is an explanatory diagram illustrating an example of the inside of an FEQ.

FIG. 2 is an explanatory diagram illustrating an example of the inside of the FEQ 31. The FEQ 31 includes the CDC sections 50 and the PBP sections 60 arranged in N stages. The CDC section 50 includes a first fast Fourier transformation (FFT) 51A, a first multiplier 52A, a first inverse fast Fourier transformation (IFFT) 53A, a second FFT 51B, a second multiplier 52B, and a second IFFT 53B. The first FFT 51A performs frequency transformation on a time-series first polarization signal H. The first polarization signal H is, for example, a horizontal polarization signal. The first multiplier 52A performs chromatic dispersion on the first polarization signal H subjected to the frequency transformation, and outputs the first polarization signal H to the first IFFT 53A. The first IFFT 53A converts the first polarization signal H subjected to the frequency transformation to a time-series signal. The second FFT 51B performs frequency transformation on a time-series second polarization signal V. The second polarization signal V is, for example, a vertical polarization signal orthogonal to the first polarization signal H. The second multiplier 52B performs chromatic dispersion on the second polarization signal V subjected to the frequency transformation, and outputs the second polarization signal V to the second IFFT 53B. The second IFFT 53B converts the second polarization signal V subjected to the frequency transformation to a time-series signal. That is, the CDC section 50 compensates chromatic dispersion of the first polarization signal H and the second polarization signal V.

Figures 3, 4:
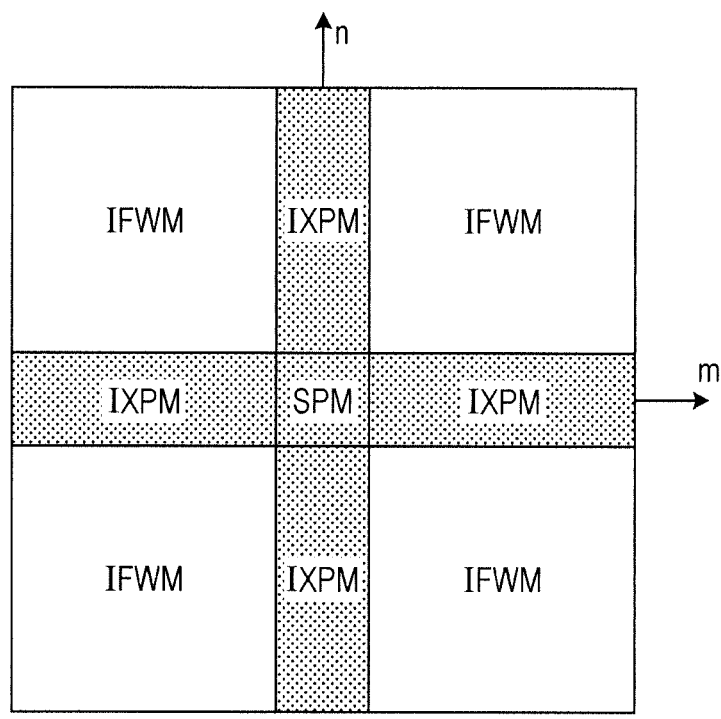
FIG. 3 is an explanatory diagram illustrating an example of a filter shape in a PBP section.
FIG. 4 is an explanatory diagram illustrating an example of a tap number table.

FIG. 3 is an explanatory diagram illustrating an example of a filter shape in the PBP section 60. First to third filters 62A to 62C described later in the PBP section 60 are exponential filters and the filter shape thereof is uniquely determined depending on the number of taps. The horizontal axis illustrated in FIG. 3 is represented by m and the vertical axis is represented by n. Then, the filter is defined as a filter h(m,n). The filter h covers a compensation amount of strict SPM, a compensation amount of IXPM from a co-polarization component, and a compensation amount of IXPM due to an interaction with a cross-polarization component as its filtering targets. It is assumed that the filter h does not cover a compensation amount of intra-channel four wave mixing (IFWM) as its filtering target.

The original arithmetic expression for calculating a compensation amount $\Delta H_k$ to be used in the PBP section 60 is represented by Math. 1. The first term of Math. 1 represents a phase compensation amount of strict SPM, that is, a current intensity waveform, the second term of Math. 1 represents a compensation amount of IXPM from a co-polarization component, and the third term of Math. 1 represents a compensation amount of IXPM due to an interaction with a cross-polarization component.

$$\Delta H_k = j\gamma h(0,0) H_K (|H_k|^2 + |V_k|^2) + \qquad \text{[Math. 1]}$$
$$j\gamma \sum_{n \neq 0} h(0,n) H_k (|H_{k+n}|^2 + |V_{k+n}|^2) +$$
$$j\gamma \sum_{m \neq 0} h(m,0)(H_k|H_{k+m}|^2 + V_k H_{k+m} V_{k+m}^*)$$

The arithmetic expression for calculating the compensation amount $\Delta H_k$ to be applied to the PBP section 60 is represented by Math. 2. The first term and the second term of Math. 1 are integrated into the first term of Math. 2, and the elements regarding H and V in the third term of Math. 1 are separated into the second term and the third term of Math. 2.

$$\Delta H_k = j\gamma H_k \sum_n h(0,n)(|H_{k+n}|^2 + |V_{k+n}|^2) + \qquad \text{[Math. 2]}$$
$$j\gamma H_k \sum_{m \neq 0} h(m,0)|H_{k+m}|^2 + j\gamma V_k \sum_{m \neq 0} h(m,0) H_{k+m} V_{k+m}^*$$

Further, the filter shapes in the H direction and in the V direction are set identical to each other, and hence h(n,0)=h(0,n)=h(n) holds.

Therefore, the following approximation of Math. 3 is applicable.

$$1 - j\varphi \approx e^{-j\varphi} \qquad \text{[Math. 3]}$$

The first polarization signal subjected to nonlinear compensation is a signal obtained by subtracting the compensation amount $\Delta H_k$ from a received first polarization signal $H_k$ based on Math. 4.

$$H_k' = H_k - \Delta H_k \qquad \text{[Math. 4]}$$

Thus, the first polarization signal H subjected to nonlinear compensation may be calculated by using Math. 5. The first term of Math. 5 represents a first phase damage amount and the second term of Math. 5 represents a first polarization damage amount.

$$H'_k = H_k \exp\left[-j\sum_n h(n)(2\gamma|H_{k+n}|^2 + \gamma|V_{k+n}|^2)\right] - \quad \text{[Math. 5]}$$

$$jV_k \sum_n h(n)\gamma H_{k+n} V^*_{k+n}$$

The PBP section 60 includes a first calculating section 61A, a second calculating section 61B, a third calculating section 61C, the first to third filters 62A to 62C, a first delaying section 63A, and a second delaying section 63B. The PBP section 60 includes a first phase rotator 64A, a second phase rotator 64B, a first phase-side multiplier 65A, and a second phase-side multiplier 65B. The PBP section 60 includes a complex conjugator 66, a first polarization-side multiplier 67A, a second polarization-side multiplier 67B, a first compensation amount converter 68A, a second compensation amount converter 68B, a first adder 69A, and a second adder 69B.

The first calculating section 61A calculates a first phase damage amount on the first polarization signal H side by using Math. 6 based on the first polarization signal H and the second polarization signal V, and outputs the first phase damage amount to the first filter 62A.

$$2\gamma|H|^2 + \gamma|V|^2 \quad \text{[Math. 6]}$$

The first filter 62A smoothes the first phase damage amount, and outputs the smoothed first phase damage amount to the first phase rotator 64A. The first phase rotator 64A performs phase rotation on the smoothed first phase damage amount as a phase compensation amount to calculate a first phase compensation amount, and outputs the first phase compensation amount to the first phase-side multiplier 65A. The first delaying section 63A delays the first polarization signal H, and outputs the first polarization signal H to the first phase-side multiplier 65A and the second polarization-side multiplier 67B. The delaying amount of the first delaying section 63A corresponds to, for example, a processing time of the first calculating section 61A, the first filter 62A, and the first phase rotator 64A.

The first phase-side multiplier 65A multiplies the first polarization signal H delayed by the first delaying section 63A by the first phase compensation amount from the first phase rotator 64A, thereby compensating the phase damage of the first polarization signal H. Then, the first phase-side multiplier 65A outputs the first polarization signal H subjected to the phase compensation to the first adder 69A.

The second calculating section 61B calculates a second phase damage amount on the second polarization signal V side by using Math. 7 based on the first polarization signal H and the second polarization signal V, and outputs the second phase damage amount to the second filter 62B.

$$2\gamma|V|^2 + \gamma|H|^2 \quad \text{[Math. 7]}$$

The second filter 62B smoothes the second phase damage amount on the second polarization signal V side, and outputs the smoothed second phase damage amount to the second phase rotator 64B. The second phase rotator 64B performs phase rotation on the smoothed second phase damage amount as a phase compensation amount to calculate a second phase compensation amount, and outputs the second phase compensation amount to the second phase-side multiplier 65B. The second delaying section 63B delays the second polarization signal V, and outputs the second polarization signal V to the second phase-side multiplier 65B and the first polarization-side multiplier 67A. The delaying amount of the second delaying section 63B corresponds to, for example, a processing time of the second calculating section 61B, the second filter 62B, and the second phase rotator 64B.

The second phase-side multiplier 65B multiplies the second polarization signal V delayed by the second delaying section 63B by the second phase compensation amount from the second phase rotator 64B, thereby compensating the phase damage of the second polarization signal V. Then, the second phase-side multiplier 65B outputs a second polarization signal L subjected to the phase compensation to the second adder 69B.

The third calculating section 61C calculates a polarization damage amount by using Math. 8 based on the first polarization signal H and the second polarization signal V. The polarization damage amount is, for example, the amount of polarization damage of the first polarization signal H and the second polarization signal V due to IXPM.

$$\gamma HV^* \quad \text{[Math. 8]}$$

The third filter 62C smoothes the polarization damage amount, and outputs the smoothed polarization damage amount to the first polarization-side multiplier 67A and the complex conjugator 66. The first polarization-side multiplier 67A multiplies the smoothed polarization damage amount and the second polarization signal V delayed by the second delaying section 63B together to calculate a first polarization damage amount, and outputs the first polarization damage amount to the first compensation amount converter 68A. The first compensation amount converter 68A calculates a first polarization compensation amount by setting the first polarization damage amount as a polarization compensation amount, and outputs the first polarization compensation amount to the first adder 69A.

The first adder 69A adds the first polarization signal H subjected to the phase compensation from the first phase-side multiplier 65A and the first polarization compensation amount from the first compensation amount converter 68A together to remove the polarization damage, and outputs the first polarization signal H subjected to the polarization compensation. As a result, the waveform degradation of the first polarization signal H due to the nonlinear optical effect such as SPM or IXPM may be compensated.

The complex conjugator 66 calculates a complex conjugate of the smoothed polarization damage amount by using Math. 9, and outputs the polarization damage amount subjected to the complex conjugation to the second polarization-side multiplier 67B.

$$HV^* = (H^*V)^* \quad \text{[Math. 9]}$$

The second polarization-side multiplier 67B multiplies the polarization damage amount subjected to the complex conjugation and the first polarization signal H delayed by the first delaying section 63A together to calculate a second polarization damage amount, and outputs the second polarization damage amount to the second compensation amount converter 68B. The second compensation amount converter 68B calculates a second polarization compensation amount by setting the second polarization damage amount as a polarization compensation amount, and outputs the second polarization compensation amount to the second adder 69B.

The second adder 69B adds the second polarization signal L subjected to the phase compensation from the second phase-side multiplier 65B and the second polarization compensation amount from the second compensation amount converter 68B together to remove the polarization damage, and outputs the second polarization signal L subjected to the polarization compensation. As a result, the waveform degradation of the second polarization signal V due to the nonlinear optical effect such as SPM or IXPM may be compensated.

The CDC sections 50 and the PBP sections 60 are components configured to compensate the nonlinear optical effect of SPM at a receiving terminal, and alternately compensate the nonlinear optical effect in a plurality of stages, that is, N stages. In the PBP section 60, the gamma coefficient γ and the number of filter taps are important operation parameters. The gamma coefficient depends on an optical power of each channel on the optical transmission line, and hence its optimum value changes depending on a fluctuation of the optical power. For example, in an optical transmission system in which a plurality of stages are arranged for a plurality of relay nodes and transmission nodes on an optical transmission line, the optical output powers of the relay nodes and the transmission nodes are different from each other in respective channels. Therefore, it is difficult for the receiving terminal to uniquely determine a value that depends on the optical output powers. Thus, the CPU 19 may sweep the gamma coefficient and specify, as an optimum gamma coefficient, a gamma coefficient at which the received Q value is larger than the optimum Q value.

The number of filter taps corresponds to the number of filter taps of each of the first to third filters 62A to 62C, and has a correlation to the transmission line dispersion value of the optical transmission line. The transmission line dispersion value is a fixed value unless the optical transmission line is changed. Therefore, the transmission line dispersion value and the number of filter taps are managed in the tap number table 18C in association with each other. FIG. 4 is an explanatory diagram illustrating an example of the tap number table 18C. In the tap number table 18C illustrated in FIG. 4, the transmission line dispersion value and the number of filter taps are managed in association with each other. The transmission line dispersion value is defined within a range from a minimum value to a maximum value. When the transmission line dispersion value of the optical transmission line connected to the optical transmission apparatus 1 is, for example, "18800", the CPU 19 specifies the number of filter taps "41" corresponding to the transmission line dispersion value within a range from "0" to "20000". When the optical transmission line dispersion value is, for example, "45000", the CPU 19 specifies the number of filter taps "161" corresponding to the transmission line dispersion value within a range from "40000" to "50000".

Figure 5:
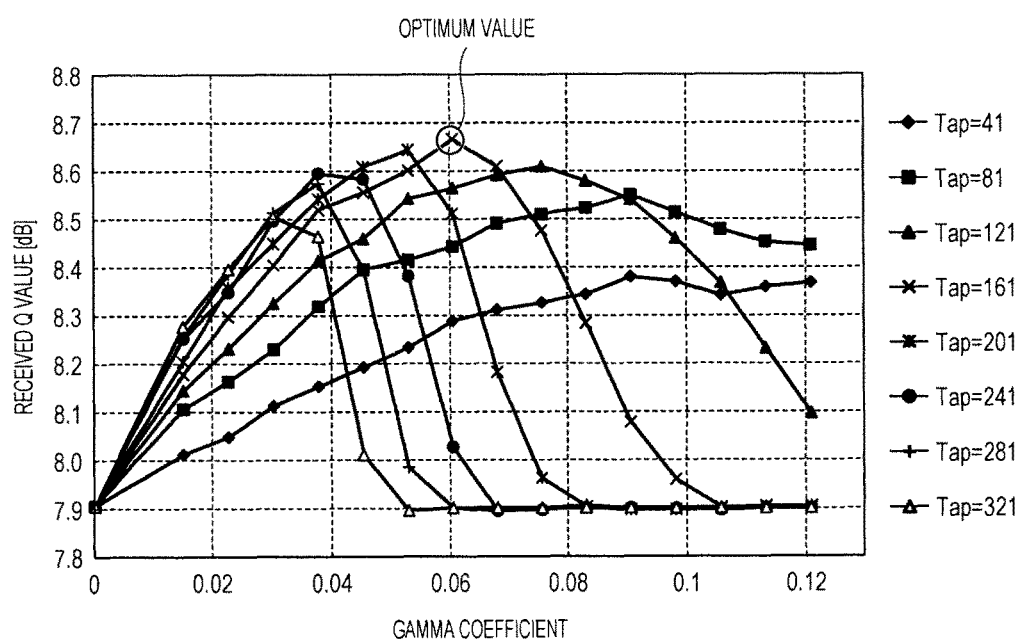
FIG. 5 is an explanatory diagram illustrating an example of a correspondence between a gamma coefficient of the PBP section and a received Q value for each number of filter taps.

FIG. 5 is an explanatory diagram illustrating an example of a correspondence between the gamma coefficient γ of the PBP section 60 and the received Q value for each number of filter taps. The CPU 19 starts measuring a received Q value for each number of filter taps in response to the sweeping of the gamma coefficient and specifies, for each gamma coefficient, an optimum gamma coefficient at which the received Q value is larger than the maximum Q value. For example, when the number of filter taps is "161", the CPU 19 specifies an optimum gamma coefficient "0.06" at which the received Q value is maximum.

Figure 6:
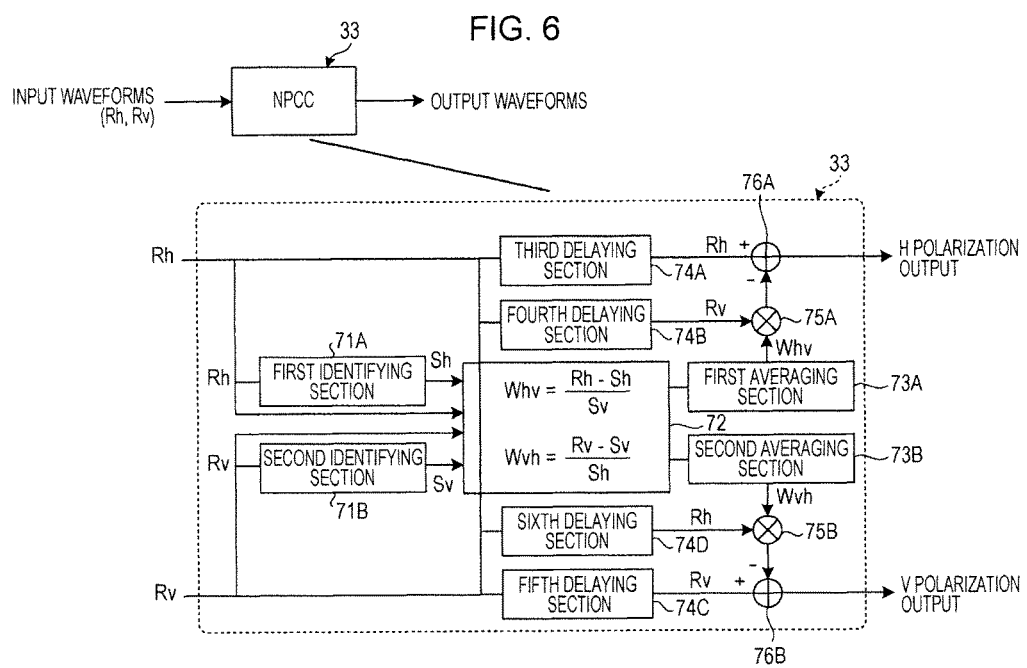
FIG. 6 is an explanatory diagram illustrating an example of the inside of an NPCC.

FIG. 6 is an explanatory diagram illustrating an example of the inside of the NPCC 33. The NPCC 33 illustrated in FIG. 6 arranges, in time series, a first polarization signal Rh and a second polarization signal Rv that are output signals of the AEQ 32. The NPCC 33 estimates a first inter-polarization crosstalk coefficient Whv of first inter-polarization crosstalk caused by the second polarization signal Rv on the first polarization signal Rh arranged in time series. Further, the NPCC 33 estimates a second inter-polarization crosstalk coefficient Wvh of second inter-polarization crosstalk caused by the first polarization signal Rh on the second polarization signal Rv arranged in time series. The NPCC 33 removes the first inter-polarization crosstalk from the first polarization signal Rh based on the estimated first inter-polarization crosstalk coefficient Whv. Further, the NPCC 33 removes the second inter-polarization crosstalk from the second polarization signal Rv based on the estimated second inter-polarization crosstalk coefficient Wvh.

The NPCC 33 includes a first identifying section 71A, a second identifying section 71B, a coefficient calculating section 72, a first averaging section 73A, and a second averaging section 73B. The NPCC 33 includes third to sixth delaying sections 74A to 74D, a first compensation amount multiplier 75A, a second compensation amount multiplier 75B, a first compensation amount adder 76A, and a second compensation amount adder 76B.

The first identifying section 71A identifies the first polarization signal Rh to acquire a first transmission-side ideal signal Sh, and outputs the first transmission-side ideal signal Sh to the coefficient calculating section 72. The second identifying section 71B identifies the second polarization signal Rv to acquire a second transmission-side ideal signal Sv, and outputs the second transmission-side ideal signal Sv to the coefficient calculating section 72. The coefficient calculating section 72 calculates the first inter-polarization crosstalk coefficient Whv and the second inter-polarization crosstalk coefficient Wvh at the time of a current symbol based on the first polarization signal Rh, the second polarization signal Rv, the first transmission-side ideal signal Sh, and the second transmission-side ideal signal Sv. The coefficient calculating section 72 receives an input of the first polarization signal Rh, the first transmission-side ideal signal Sh, and the second transmission-side ideal signal Sv, and calculates the first inter-polarization crosstalk coefficient Whv based on (Rh−Sh)/Sv. The coefficient calculating section 72 receives an input of the second polarization signal Rv, the first transmission-side ideal signal Sh, and the second transmission-side ideal signal Sv, and calculates the second inter-polarization crosstalk coefficient Wvh based on (Rv−Sv)/Sh.

The first averaging section 73A calculates an average of the first inter-polarization crosstalk coefficients Whv at the time of a plurality of symbols corresponding to a set averaging length, and outputs the average of the first inter-polarization crosstalk coefficients Whv to the first compensation amount multiplier 75A. The third delaying section 74A delays the first polarization signal Rh arranged in time series, and outputs the first polarization signal Rh to the first compensation amount adder 76A. The fourth delaying section 74B delays the second polarization signal Rv arranged in time series, and outputs the second polarization signal Rv to the first compensation amount multiplier 75A.

The first compensation amount multiplier 75A multiplies the delayed second polarization signal Rv from the fourth delaying section 74B and the average of the first inter-polarization crosstalk coefficients Whv from the first averaging section 73A together to calculate a first crosstalk compensation amount. Then, the first compensation amount multiplier 75A outputs the calculated first crosstalk compensation amount to the first compensation amount adder 76A. The first compensation amount adder 76A subtracts the first crosstalk compensation amount from the delayed first polarization signal Rh from the third delaying section 74A, and outputs the first polarization signal Rh subjected to the crosstalk compensation. As a result, the waveform degradation of the first polarization signal H due to the nonlinear optical effect such as inter-polarization crosstalk of an inter-channel nonlinear effect may be compensated.

The second averaging section 73B calculates an average of the second inter-polarization crosstalk coefficients Wvh at the time of a plurality of symbols corresponding to a set averaging length, and outputs the average of the second inter-polarization crosstalk coefficients Wvh to the second compensation amount multiplier 75B. The fifth delaying section 74C delays the second polarization signal Rv arranged in time series, and outputs the second polarization signal Rv to the second compensation amount adder 76B. The sixth delaying section 74D delays the first polarization signal Rh arranged in time series, and outputs the first polarization signal Rh to the second compensation amount multiplier 75B.

The second compensation amount multiplier 75B multiplies the delayed first polarization signal Rh from the sixth delaying section 74D and the average of the second inter-polarization crosstalk coefficients Wvh from the second averaging section 73B together to calculate a second crosstalk compensation amount. Then, the second compensation amount multiplier 75B outputs the calculated second crosstalk compensation amount to the second compensation amount adder 76B. The second compensation amount adder 76B subtracts the second crosstalk compensation amount from the delayed second polarization signal Rv from the fifth delaying section 74C, and outputs the second polarization signal Rv subjected to the crosstalk compensation. As a result, the waveform degradation of the second polarization signal L due to the nonlinear optical effect such as inter-polarization crosstalk of an inter-channel nonlinear effect may be compensated.

The averaging lengths of the first averaging section 73A and the second averaging section 73B depend significantly on the accuracy of the first inter-polarization crosstalk coefficient Whv and the second inter-polarization crosstalk coefficient Wvh, and are therefore important parameters on the NPCC 33 configured to compensate the inter-polarization crosstalk. Therefore, the CPU 19 sets an optimum averaging length of the NPCC 33 by executing the NPCC optimization processing.

Figure 7:
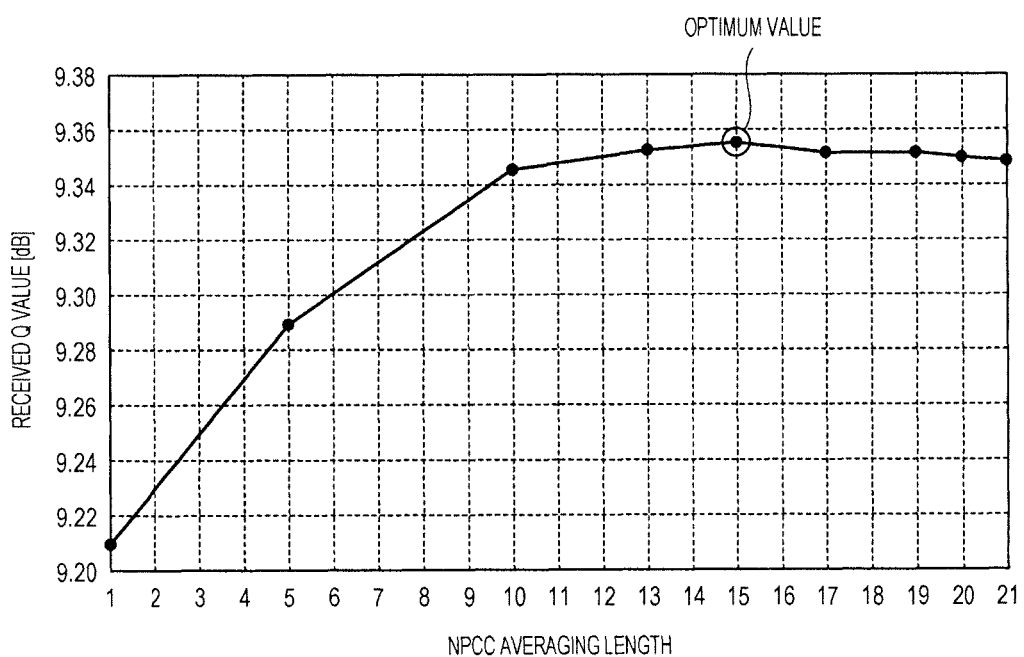
FIG. 7 is an explanatory diagram illustrating an example of a correspondence between an averaging length of the NPCC and the received Q value.

FIG. 7 is an explanatory diagram illustrating an example of a correspondence between the averaging length of the NPCC 33 and the received Q value. The CPU 19 starts measuring a received Q value in response to the start of sweeping of the averaging length of the NPCC 33 and specifies, for each averaging length, an optimum averaging length at which the received Q value is larger than the maximum Q value. As illustrated in FIG. 7, the CPU 19 specifies, for example, an optimum averaging length "15" at which the received Q value is an optimum value (maximum value). Then, the CPU 19 sets the specified optimum averaging length as the averaging length of each of the first averaging section 73A and the second averaging section 73B of the NPCC 33.

Figure 8:
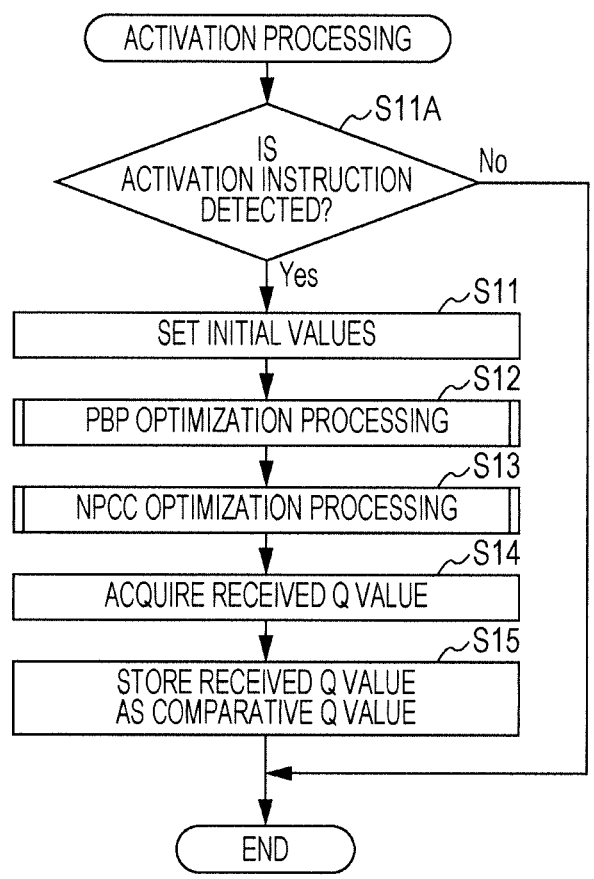
FIG. 8 is a flowchart illustrating an example of processing operations of a CPU in the optical transmission apparatus regarding activation processing.

Next, operations of the optical transmission apparatus 1 of this embodiment are described. FIG. 8 is a flowchart illustrating an example of processing operations of the CPU 19 in the optical transmission apparatus 1 regarding activation processing. The CPU 19 determines whether or not an activation instruction for the optical transmission apparatus 1 is detected (Step S11A). When the activation instruction is detected (Yes in Step S11A), the CPU 19 sets initial values in each of the PBP section 60 and the NPCC 33 (Step S11). The initial values are initial values of various parameters or the like to be set in each of the PBP section 60 and the NPCC 33. The CPU 19 executes the PBP optimization processing illustrated in FIG. 10 as described later (Step S12). The PBP optimization processing is processing of optimizing the number of filter taps and the gamma coefficient of the parameters to be set in the PBP section 60. The CPU 19 executes the NPCC optimization processing illustrated in FIG. 12 as described later (Step S13). The NPCC optimization processing is processing of optimizing the averaging length of the parameters to be set in the NPCC 33. The CPU 19 acquires a received Q value after the NPCC optimization processing has been executed (Step S14), stores the acquired received Q value in the comparative Q value memory 18E as a comparative Q value (Step S15), and terminates the processing operations illustrated in FIG. 8. When the activation instruction is not detected (No in Step S11A), the CPU 19 terminates the processing operations illustrated in FIG. 8.

The CPU 19 configured to execute the activation processing illustrated in FIG. 8 executes the PBP optimization processing and the NPCC optimization processing when the activation instruction is detected. As a result, at the time of activation, the optical transmission apparatus 1 may set the parameters in the PBP section 60 to optimum values and then automatically set the parameter in the NPCC 33 to an optimum value.

Figure 9:
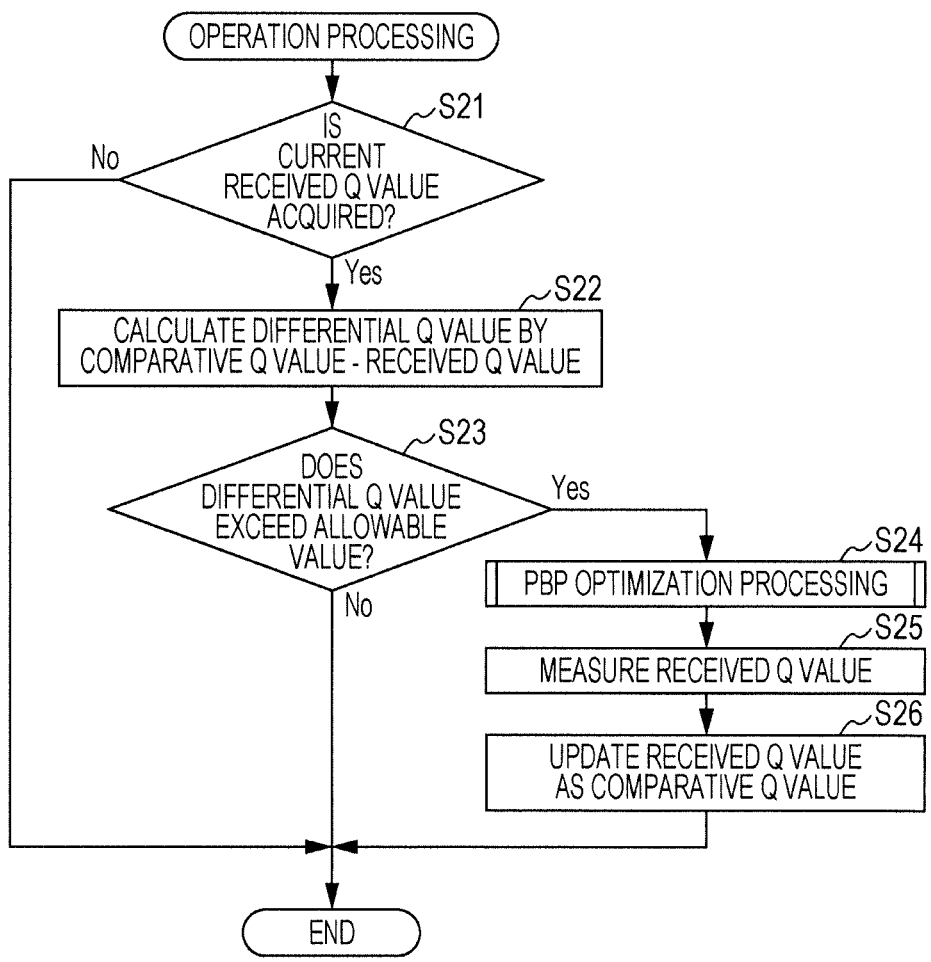
FIG. 9 is a flowchart illustrating an example of processing operations of the CPU in the optical transmission apparatus regarding operation processing.

FIG. 9 is a flowchart illustrating an example of processing operations of the CPU 19 in the optical transmission apparatus 1 regarding the operation processing. The first measuring section 42A in the CPU 19 determines whether or not a current received Q value is acquired through the received Q value monitor 35 during operation (Step S21). When the current received Q value is acquired (Yes in Step S21), the determining section 45 in the CPU 19 calculates a differential Q value by subtracting the current received Q value from the comparative Q value in the comparative Q value memory 18E (Step S22).

The determining section 45 determines whether or not the differential Q value exceeds an allowable value (Step S23). The allowable value is assumed to be, for example, 1 dB. When the differential Q value exceeds the allowable value (Yes in Step S23), the determining section 45 executes the PBP optimization processing illustrated in FIG. 10 (Step S24). After the PBP optimization processing has been executed, the first measuring section 42A in the CPU 19 measures a current received Q value (Step S25), updates the received Q value in the comparative Q value memory 18E as a comparative Q value (Step S26), and terminates the processing operations illustrated in FIG. 9. When the differential Q value does not exceed the allowable value (No in Step S23), the determining section 45 terminates the processing operations illustrated in FIG. 9. When the current received Q value is not acquired (No in Step S21), the determining section 45 terminates the processing operations illustrated in FIG. 9.

The CPU 19 configured to execute the operation processing illustrated in FIG. 9 monitors the current received Q value during operation and, when the differential Q value between the current received Q value and the comparative Q value exceeds the allowable value, executes the PBP optimization processing so as to update the parameters of the PBP section 60 again. As a result, even when the current received Q value has decreased, the operation parameters of the PBP section 60 may be updated to optimum values. The optimum gamma coefficient and the optimum number of filter taps of the PBP section 60 may be set even when the optical output power has fluctuated due to, for example, a variation of the number of nodes arranged on the optical transmission line.

Figure 10:
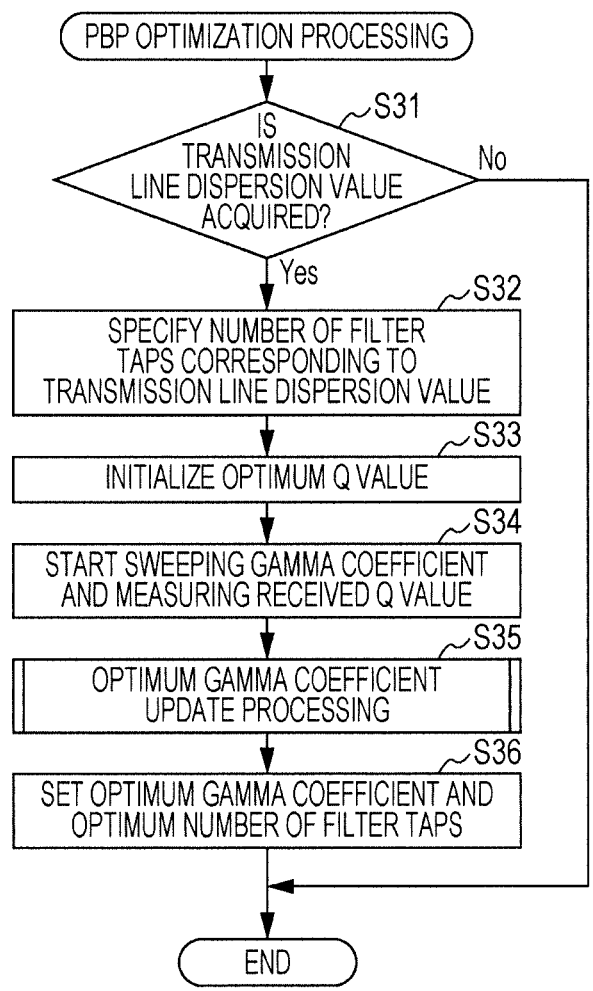
FIG. 10 is a flowchart illustrating an example of processing operations of the CPU in the optical transmission apparatus regarding PBP optimization processing.

FIG. 10 is a flowchart illustrating an example of processing operations of the CPU 19 in the optical transmission apparatus 1 regarding the PBP optimization processing. The first specifying section 43A in the CPU 19 determines whether or not a transmission line dispersion value of the optical transmission line is acquired (Step S31). It is assumed that the transmission line dispersion value is, for example, set in advance. When the transmission line dispersion value is acquired (Yes in Step S31), the first specifying section 43A specifies the number of filter taps corresponding to the transmission line dispersion value from the tap number table 18C (Step S32).

The first measuring section 42A in the CPU 19 initializes the optimum Q value stored in the optimum Q value memory 18F (Step S33). After the number of filter taps has been specified, the CPU 19 starts sweeping the gamma coefficient through the first sweeping section 41A and measuring the received Q value through the first measuring section 42A (Step S34). In response to the start of sweeping of the gamma coefficient and measurement of the received Q value, the CPU 19 executes optimum gamma coefficient update processing illustrated in FIG. 11 (Step S35). After the optimum gamma coefficient update processing has been executed, the first setting section 44A in the CPU 19 sets the optimum gamma coefficient and the optimum number of filter taps in the PBP section 60 (Step S36), and terminates the processing operations illustrated in FIG. 10. When the transmission line dispersion value is not acquired (No in Step S31), the CPU 19 terminates the processing operations illustrated in FIG. 10.

The CPU 19 configured to execute the PBP optimization processing illustrated in FIG. 10 specifies, when the transmission line dispersion value is acquired, the number of filter taps corresponding to the transmission line dispersion value and starts sweeping the gamma coefficient and measuring the received Q value. After the sweeping of the gamma coefficient and the measurement of the received Q value have been started, the CPU 19 executes the optimum gamma coefficient update processing and sets the optimum gamma coefficient and the optimum number of filter taps in the PBP section 60. As a result, the optimum gamma coefficient and the optimum number of filter taps are set and the PBP section 60 therefore compensates the nonlinear damage due to SPM or the like, thereby being capable of improving the signal quality and increasing the transmission distance.

Figure 11:
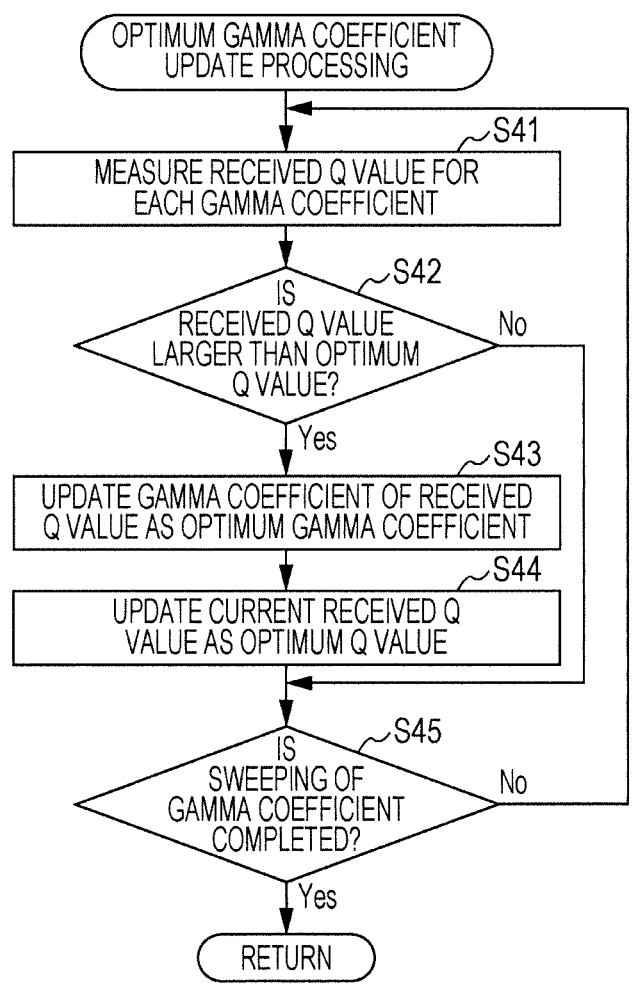
FIG. 11 is a flowchart illustrating an example of processing operations of the CPU in the optical transmission apparatus regarding optimum gamma coefficient update processing.

FIG. 11 is a flowchart illustrating an example of processing operations of the CPU 19 in the optical transmission apparatus 1 regarding the optimum gamma coefficient update processing. In response to the start of sweeping of the gamma coefficient, the first measuring section 42A in the CPU 19 measures the received Q value for each gamma coefficient (Step S41), and determines whether or not the current received Q value is larger than the optimum Q value (Step S42). When the current received Q value is larger than the optimum Q value (Yes in Step S42), the first specifying section 43A in the CPU 19 updates the gamma coefficient of the received Q value in the gamma coefficient memory 18B as an optimum gamma coefficient (Step S43). The first specifying section 43A updates the current received Q value in the optimum Q value memory 18F as an optimum Q value (Step S44). The first sweeping section 41A determines whether or not the sweeping of the gamma coefficient is completed (Step S45). When the sweeping of the gamma coefficient is completed (Yes in Step S45), the first sweeping section 41A determines that the sweeping is completed up to the upper limit of the sweeping range of the gamma coefficient, and terminates the processing operations illustrated in FIG. 11.

When the sweeping of the gamma coefficient is not completed by the first sweeping section 41A (No in Step S45), the first measuring section 42A proceeds to Step S41 so as to measure the received Q value for each gamma coefficient. When the current received Q value is not larger than the optimum Q value (No in Step S42), the first specifying section 43A proceeds to Step S45 so as to determine whether or not the sweeping of the gamma coefficient is completed.

The CPU 19 configured to execute the optimum gamma coefficient update processing illustrated in FIG. 11 measures the received Q value for each gamma coefficient in response to the sweeping of the gamma coefficient and, when the received Q value is larger than the optimum Q value, updates the gamma coefficient of the received Q value as an optimum gamma coefficient. As a result, the optimum gamma coefficient may be acquired.

Figure 12:
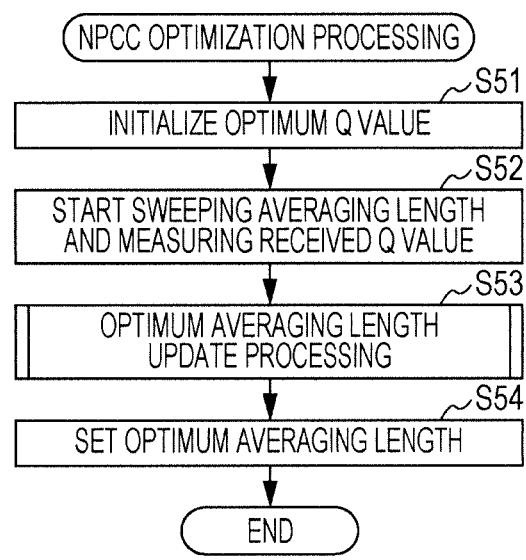
FIG. 12 is a flowchart illustrating an example of processing operations of the CPU in the optical transmission apparatus regarding NPCC optimization processing.

FIG. 12 is a flowchart illustrating an example of processing operations of the CPU 19 in the optical transmission apparatus 1 regarding the NPCC optimization processing. The second measuring section 42B in the CPU 19 initializes the optimum Q value stored in the optimum Q value memory 18F (Step S51). The CPU 19 starts sweeping the averaging length of the NPCC 33 through the second sweeping section 41B and measuring the received Q value through the second measuring section 42B (Step S52). In response to the start of sweeping of the averaging length and measurement of the received Q value, the CPU 19 executes optimum averaging length update processing illustrated in FIG. 13 (Step S53). After the optimum averaging length update processing has been executed, the second setting section 44B in the CPU 19 sets the optimum averaging length in the NPCC 33 (Step S54), and terminates the processing operations illustrated in FIG. 12.

The CPU 19 configured to execute the NPCC optimization processing illustrated in FIG. 12 starts sweeping the averaging length and measuring the received Q value. After the sweeping of the averaging length and the measurement of the received Q value have been started, the CPU 19 executes the optimum averaging length update processing and sets the optimum averaging length in the NPCC 33. As a result, the optimum averaging length is set and the NPCC 33 therefore compensates the nonlinear damage due to XPM, thereby being capable of improving the signal quality and increasing the transmission distance.

Figure 13:
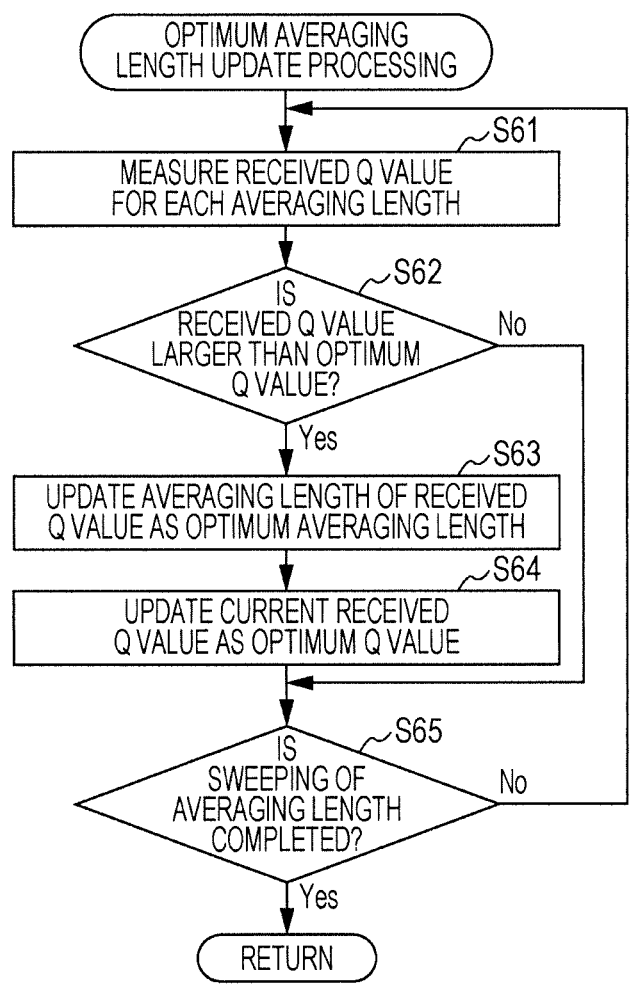
FIG. 13 is a flowchart illustrating an example of processing operations of the CPU in the optical transmission apparatus regarding optimum averaging length update processing.

FIG. 13 is a flowchart illustrating an example of processing operations of the CPU 19 in the optical transmission apparatus 1 regarding the optimum averaging length update processing. In response to the start of sweeping of the averaging length, the second measuring section 42B in the CPU 19 measures the received Q value for each averaging length (Step S61). The second specifying section 43B in the CPU 19 determines whether or not the current received Q value is larger than the optimum Q value (Step S62). When the current received Q value is larger than the optimum Q value (Yes in Step S62), the second specifying section 43B updates the averaging length of the received Q value in the averaging length memory 18D as an optimum averaging length (Step S63). The second specifying section 43B updates the current received Q value in the optimum Q value memory 18F as an optimum Q value (Step S64).

After the optimum Q value has been updated, the second sweeping section 41B in the CPU 19 determines whether or not the sweeping of the averaging length is completed (Step S65). When the sweeping of the averaging length is completed (Yes in Step S65), the second specifying section 43B determines that the sweeping is completed up to the upper limit of the sweeping range of the averaging length, and terminates the processing operations illustrated in FIG. 13.

When the sweeping of the averaging length is not completed (No in Step S65), the second specifying section 43B proceeds to Step S61 so as to measure the received Q value for each averaging length. When the current received Q value is not larger than the optimum Q value (No in Step S62), the second sweeping section 42B proceeds to Step S65 so as to determine whether or not the sweeping of the averaging length is completed.

The CPU 19 configured to execute the optimum averaging length update processing illustrated in FIG. 13 measures the received Q value for each averaging length in response to the sweeping of the averaging length and, when the received Q value is larger than the optimum Q value, updates the averaging length of the received Q value as an optimum averaging length. As a result, the optimum averaging length may be acquired.

When the activation instruction is detected, the optical transmission apparatus 1 of this embodiment executes the PBP optimization processing and then the NPCC optimization processing, thereby being capable of optimizing the parameters to be set in the PBP section 60 and the NPCC 33 while reducing the circuit scale. As a result, it is possible to compensate the nonlinear damage due to SPM or the like by the PBP section 60 and the nonlinear damage due to XPM or the like by the NPCC 33 while reducing the circuit scale. Further, it is possible to improve the signal quality and increase the transmission distance.

The optical transmission apparatus 1 starts sweeping the gamma coefficient of the PBP section 60 when the amount of decrease in the received Q value, such as the differential Q value, has exceeded the allowable value during operation. The optical transmission apparatus 1 may start measuring gamma coefficients when the received Q value becomes below a predetermined threshold.

As a result, the optimum gamma coefficient and the optimum number of filter taps of the PBP section 60 may be set even when the optical output power has fluctuated due to, for example, a variation of the number of nodes arranged on the optical transmission line.

In the embodiment described above, the NPCC optimization processing is executed after the PBP optimization processing has been executed, but the embodiment is not limited thereto. For example, the PBP optimization processing may be executed after the NPCC optimization processing has been executed.

In the optical transmission apparatus 1 of the embodiment described above, there is exemplified a case where both of the PBP section 60 and the NPCC 33 perform ON operations, that is, operate in combination in the reception processor 12B. The PBP section 60 and the NPCC 33 are set switchable between ON and OFF, that is, one of the PBP section 60 and the NPCC 33 may be skipped. Thus, the PBP section 60 may be turned ON while the NPCC 33 is turned OFF. In this case, the PBP optimization processing is executed but the NPCC optimization processing is not executed thereafter. Further, the PBP section 60 may be turned OFF while the NPCC 33 is turned ON. In this case, the PBP optimization processing is not executed but the NPCC optimization processing is executed. Both of the PBP section 60 and the NPCC 33 are incorporated in the optical transmission apparatus 1, but there is provided an embodiment in which only one of the PBP section 60 and the NPCC 33 is incorporated. When the PBP section 60 is incorporated, the PBP optimization processing is executed. When the NPCC 33 is incorporated, the NPCC optimization processing is executed.

In the embodiment described above, when the optimum gamma coefficient and the optimum averaging length are specified, it is determined whether or not the received Q value is larger than the optimum Q value as the reception quality, but a received BER may be used as the reception quality. In this case, it may be determined whether or not the received BER is larger than an optimum BER value, and the gamma coefficient and the averaging length at which the received BER is larger than the optimum BER value may be specified as the optimum gamma coefficient and the optimum averaging length.

In the embodiment described above, the received Q value monitor 35 is arranged at an input stage of the FEC decoder 34 and the received Q value is measured at the input stage of the FEC decoder 34. However, the position of the received Q value monitor 35 is not limited to this position. For example, the received Q value monitor 35 may be arranged at an output stage of the FEC decoder 34 and the received Q value may be measured at the output stage of the FEC decoder 34.

In the embodiment described above, the transmission line dispersion value of the optical transmission line to be used for specifying the number of filter taps of the PBP section 60 is acquired in advance as a design matter of the optical transmission line but, for example, an estimator configured to estimate the transmission line dispersion value of the optical transmission line may be arranged at an output stage of the FEQ 31.

In the embodiment described above, the PBP optimization processing is executed when the received Q value has decreased during operation, but the embodiment is not limited thereto. For example, the PBP optimization processing may be executed depending on a variation of the number of wavelengths of the received signal. Even when the number of wavelengths has varied, the transmission quality may be maintained.

The constituent elements of the respective sections illustrated in the drawings may physically be configured in a way other than in the drawings. That is, the specific mode of distribution and integration of the respective sections is not limited to the mode illustrated in the drawings and all or part thereof may functionally or physically be distributed or integrated in arbitrary units in accordance with various loads, usage, and the like.

All or arbitrary part of various processing functions to be executed by the respective devices may be executed on a central processing unit (CPU) (or a microcomputer such as a micro processing unit (MPU) or a micro controller unit (MCU)). As a matter of course, all or arbitrary part of the various processing functions may be executed on a program analyzed and executed by the CPU (or a microcomputer such as an MPU or an MCU) or on hardware with wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving apparatus comprising:
a first processor configured to perform a compensation, in a perturbation back-propagation (PBP) scheme, waveform degradation of a received optical signal due to a nonlinear optical effect by traveling an optical transmission line;
a memory to store gamma coefficients corresponding to optical powers, respectively, of a channel on the optical transmission line as reception quality parameters of the PBP scheme; and
a second processor coupled to the memory and the second processor configured to,
perform a plurality of measurements of reception quality of the received optical signal for a plurality of different gamma coefficients in the PBP scheme, respectively,
specify a gamma coefficient from among the plurality of different gamma coefficients in the plurality of measurements at which a measured reception quality is at least larger than a reference reception quality to control the compensation, and
update the gamma coefficients in the memory with the specified gamma coefficient corresponding to the measured reception quality as an updated gamma coefficient to update the reception quality parameters of the PBP scheme and update the reference reception quality with the measured reception quality corresponding to the specified gamma coefficient; and wherein the specified gamma coefficient is specified when determined that a differential value between a current measured reception quality and a comparative reception quality exceeds a threshold.

2. The receiving apparatus according to claim 1, wherein the memory is further configured to store a number of filter taps to be used as other reception quality parameter of the PBP scheme for each chromatic dispersion value of the optical transmission line, and
wherein the second processor is configured to
specify the number of filter taps corresponding to a designated chromatic dispersion value from the memory, and
set the specified number of filter taps as the other reception quality parameter of the PBP scheme.

3. The receiving apparatus according to claim 1, wherein the second processor is configured to start measuring the gamma coefficients when an amount of decrease in reception quality has exceeded a predetermined threshold.

4. The receiving apparatus according to claim 1, wherein the second processor is configured to start measuring the gamma coefficients when reception quality becomes below a predetermined threshold.

5. The receiving apparatus according to claim 1, wherein the second processor is configured to start measuring the gamma coefficients depending on a variation of a number of wavelengths of the received optical signal.

6. The receiving apparatus according to claim 1, wherein the first processor is a digital signal processor.

* * * * *